United States Patent [19]

Leroy

[11] Patent Number: 5,573,574
[45] Date of Patent: Nov. 12, 1996

[54] ELECTROREFINED ALUMINIUM WITH A LOW CONTENT OF URANIUM, THORIUM AND RARE EARTHS

[75] Inventor: Michel Leroy, St. Egreve, France

[73] Assignee: Aluminium Pechiney, Courbevoie, France

[21] Appl. No.: 381,883

[22] PCT Filed: Jul. 11, 1994

[86] PCT No.: PCT/FR94/00862

§ 371 Date: Jun. 13, 1995

§ 102(e) Date: Jun. 13, 1995

[87] PCT Pub. No.: WO95/03434

PCT Pub. Date: Feb. 2, 1995

[30] Foreign Application Priority Data

Jul. 22, 1993 [FR] France .................................. 93 09254

[51] Int. Cl.$^6$ ............................ C22B 9/00; C22B 21/00
[52] U.S. Cl. ................... 75/406; 75/671; 75/678; 75/679; 75/686; 205/364; 205/372
[58] Field of Search ............................. 148/437; 75/406, 75/671, 678, 679, 686; 420/528, 590; 204/67

[56] References Cited

U.S. PATENT DOCUMENTS 4,273,627  6/1981  Dawless et al. ...................... 204/67

FOREIGN PATENT DOCUMENTS

| | | |
|---|---|---|
| 0459303 | 12/1991 | European Pat. Off. . |
| 759588 | 2/1934 | France . |
| 832528 | 9/1938 | France . |
| 1594154 | 6/1970 | France . |
| 2445380 | 7/1980 | France . |
| 1080786 | 10/1960 | Germany . |
| 198199 | 9/1938 | Switzerland . |
| 217552 | 2/1942 | Switzerland . |

OTHER PUBLICATIONS

Kondo, et al., "The Production of High-Purity Aluminum in Japan", JOM, Nov. 1990, pp. 36–37.

Hannibal, et al., Metallwissenschat und Technik, vol. 27, No. 3 (Mar. 1973), pp. 203–211.

Primary Examiner—David A. Simmons
Assistant Examiner—Robert R. Koehler
Attorney, Agent, or Firm—Dennison, Meserole, Pollack & Scheiner

[57] ABSTRACT

A process for obtaining aluminum of purity above 99.998%. A liquid aluminum raw material is subjected to a fractional crystallization to obtain prepurified aluminum crystals in a yield of between 50 and 80% and a liquid aluminum portion of lesser purity. The prepurified aluminum crystals are subjected to a three-layer electrolysis process in which the uppermost layer comprises a cathodic purified aluminum layer. The aluminum of purity above 99.998% is removed from the uppermost layer at a yield of above 90%, the aluminum having a total rare earth content of less than 100 ppb and a total content of U+Th of less than 20 ppb.

6 Claims, No Drawings

ELECTROREFINED ALUMINIUM WITH A LOW CONTENT OF URANIUM, THORIUM AND RARE EARTHS

BACKGROUND OF THE INVENTION

The invention relates to an aluminium of above 99.998% purity which is a product of electrolytic refining, and the invention also relates to a process for obtaining this aluminium.

DESCRIPTION OF RELATED ART

High purity aluminium which is used for metallization of electronic circuits, for example, needs to have aft extremely low content of impurities, particularly those which tend to emit alpha particles which can modify the content of the circuit memories.

Generally speaking, at least 3 categories of high purity aluminium are used by circuit manufacturers, after mostly adding high purity alloy elements:

- a first category, for less strict applications, specifies a uranium+thorium content of less than 20 ppb (parts per milliard $10^{-3}$ ppm) and a minimum aluminium content of above 99.998%.
- a second category, for more usual applications, specifies a U+Th content of less than 5 ppb and a minimum Al content of above 99.999%.
- a third category, for more demanding applications specifies a minimum Al content of above 99.9995%, (and even sometimes above 99.9997%) and a U+Th content of less than 1 ppb, and even sometimes less than 0.3 or 0.1 ppb.

Rare earths, some of which, like samarium, have a significant alpha radioactivity, are also undesirable. By way of example, 10 ppb of natural samarium emits as many alpha particles as 0.1 ppb of uranium 238. The high purity aluminium used for this application is usually obtained by way of two successive stages:

a) electrolytic refining by way of the process known as 3 layer electrolysis, as described in French Patent Nos. 759588 and 832528, for example.

These 3 layers which are kept at a temperature of at least 700° C. are successively:

- at the base, a dense aluminium-copper alloy to be refined, of anodic potential.
- in the middle, an electrolytic bath constituted of a molten mixture of fluorides and possible chlorides floating on the base alloy.
- at the top, very pure cathodic aluminium floating on the bath.

The refining is done by transferring the aluminium from the bottom alloy to the surface layer, leaving in the impure bottom alloy impurities which are nobler than aluminium, and by oxidising the metal impurities which are less noble than aluminium and which are trapped in the bath.

However, it is seen that although electrolytic refining is very effective in eliminating major impurities from the primary aluminium, such as Fe, Si, Ga, Zn, it is not very effective for eliminating certain impurities in particular such as uranium, thorium and rare earths which are always present in the aluminium to be refined but also in the halogenated salts which constitute or correct the electrorefining bath. In certain cases, these latter can even lead to an increase in the content of these elements. The reason for the inefficiency with respect to these particular impurities is still unaccounted for.

Thus, the metal which has been electrolytically refined from the primary aluminium, even high purity aluminium, or even from aluminium which has already been refined electrolytically, still contains more than 50 ppb U+Th and more than 200 ppb of rare earths (mainly La, Ce, Nd, Pt, Sm). For this reason, this stage of electrolytic refining, for the application indicated, is always followed by a second purification stage to eliminate these harmful impurities.

b) physical purification of the electroredefined metal by way of various processes, such as the CZOCHRALSKY method of pulling crystals, zone fusion or segregation. This latter process is described in French Patent 1594154 (=U.S. Pat. No. 3,671,229). It consists in cooling the aluminium to be purified in a crucible under properly laid down thermic conditions in order to recover and separate the crystals formed which are heavier and of greater purity than the surrounding liquid. By way of successive refusion and resolidification operations, accompanied by compression which enables the impure liquid remaining trapped between the crystals to be expelled, a very pure metal is obtained at the bottom of the crucible, whilst the upper part which has remained liquid contains the greatest part of eutectic impurities initially contained in the metal to be purified.

An example of the successive application of these two techniques to obtain an aluminium of 99.999% purity is illustrated in French Patent No. 2445380 (=U.S. Pat. No. 4,222,830).

As mentioned in that patent, the fractionation crystallization stage usually has a mediocre metal yield of between 30 and 70% depending on the purity of the metal which is to be obtained. This causes a major part of the metal which has previously been electrorefined to be downgraded, and increases the operational costs for the usable fraction of the metal.

SUMMARY OF THE INVENTION

The invention relates to an aluminium of above 99.999% purity obtained by electrolytic refining so that at the output of the refining vessel and without any subsequent treatment its content of rare earths is less than 100 ppb and its total content of uranium and of thorium is less than 20 ppb.

The invention also relates to an economical process for the production of this high purity aluminium which consists in carrying out an initial fractionation crystallisation operation with a yield of prepurified metal of between 50 and 80%, and then in subjecting this prepurified metal to electrolytic refining of the 3 layer type with a final yield of purified metal of above 90%.

DETAILED DESCRIPTION OF THE INVENTION

The first operation consists of very substantially purifying the primary aluminium into eutectic elements, in particular into uranium, thorium, their radioactive separation products and into rare earths (lanthanum, cerium, neodymium, praseodymium, samarium ) by way of an initial fractionation crystallisation operation, such as segregation as described in French Patent No. 1594154. A yield of prepurified metal of between 50 and 80% enables the contents of metal in these particular impurities to be divided by more than 10, and often even by 100.

This operation which is carried out with a rapid cycle and with a good metal yield, thus with a restricted rate of downgrading of the impure metal, and by using a crucible of standard purity is carried out under economically favourable conditions, especially since the cost of downgrading the primary impure metal which has a high content of eutectic impurities is low.

The second stage consists in supplying the vessel used for the 3 layer process of electrolytic refining with the metal which has been segregated beforehand and from which a substantial amount of its impurities giving off alpha particles has been removed.

To further improve the purity of the metal obtained, it is possible to purify the salts (e.g. sodium fluorides and aluminium fluorides, barium chloride or fluoride) used to make up the electrolytic bath and those which need to be added during the operation to maintain the initial composition of the bath in order to compensate for the losses.

To this end, these salts are contacted with a mass of molten aluminium capable of reducing the impurities which are more noble than aluminium, and of absorbing them.

This contacting can be carried out in various ways, e.g. in a crucible which is separate from the refining vessel or through a graphite ring passing through the upper layer of refined metal. In this latter case, the liquid layer of the electrolytic bath is supplied with solid salts used to correct the composition of the bath through the ring, and a mass of molten aluminium is kept in the ring which is capable of reducing the salt impurities and of absorbing them. This mass of molten aluminium will be drawn off the graphite ring before this latter is removed.

It is therefore possible to obtain an aluminium of above 99.999% purity which has a particularly low content of uranium, thorium and rare earths with the following contents of impurities:

Si<2 ppm

Fe<2 ppm

Cu<2 ppm

U+Th<20 ppb

La+Ce+Nd+Pr+Sm<100 ppb whilst the electrorefined aluminium which is produced in the conventional way from primary, non-treated aluminium still contains more than 50 ppb U+Th and more than 200 ppb of rare earths.

If, for more demanding applications, it is desirable to have an aluminium of very high purity, of more than 99.999% purity, with a content of U+Th of <0.1 ppb, the electrorefined metal described hereinabove is subjected to an additional rapid operation for physical purification, e.g. by segregation, zone fusion or CZOCHRALSKY crystal separation. To do this, a crucible or high purity boat is used, usually graphite, which; in turn, have a controlled content of U+Th+<1 ppm in order to avoid any contamination of the metal by the crucible. It is, in fact, known that segregation crucibles have a limited life and can therefore be exhausted, and this increases production costs. However, since this third stage is carried out with a rapid cycle, and therefore has a high metal yield of between 30 and 80%, but most frequently above 50%, the whole of the preparation results in an overall metal yield which is clearly greater than that according to the prior art. Therefore the cost per tonne of metal produced according to the invention is less.

EXAMPLE 1

Aluminium was produced which was refined electrolytically by way of the 3 layer process, firstly from 99.92% primary metal and secondly from the same metal purified by segregation to 99.99%. For the prior art process, after electrolytic refining, in one case segregation was effected in a standard crucible, e.g. a vessel of plumbago, a baked mixture of silicon carbide, clay and graphite, producing a 99.999% aluminium, and in the other case segregation was effected in a high purity crucible producing a 99.9995% aluminium.

For the process according to the invention, following electrolytic refining, rapid segregation was carried out in a high purity crucible in order to obtain a 99.9998% aluminium.

The accompanying table indicates the respective content of uranium, thorium and rare earths at the various production stages, and also the metal yields for each of the operations.

It is noted that in order to obtain 99.999% aluminium, the metal yield in the prior art process is 0.97×0.5=0.485, whereas in the process according to the invention it is 0.7×0.97=0.6791.

In the case of 99.9995% aluminium, the metal yield is 0.97×0.3=0.291 for the prior art and 0.679×0.6=0.407 for the invention.

EXAMPLE 2

The initial metal is a 99.6% primary metal which is clearly less pure than in the previous example. The respective contents of uranium, thorium and rare earths, and also the yields of metal at the various stages of production are given in Table 2. With the prior art process which comprises 3 layer electrolytic refining and segregation in a crucible of plumbago, a metal is obtained with 15 ppb uranium, 18 ppb thorium and 130 ppb rare earths, with a metal yield of 0.97×0.5=0.485.

With the process according to the invention, by way of rapid segregation in a standard crucible of plumbago and then 3 layer electrolytic refining an aluminium with 4 ppb uranium, 11 ppb thorium and 70 ppb of rare earths is obtained, with a metal yield of 0.7×0.97=0.679.

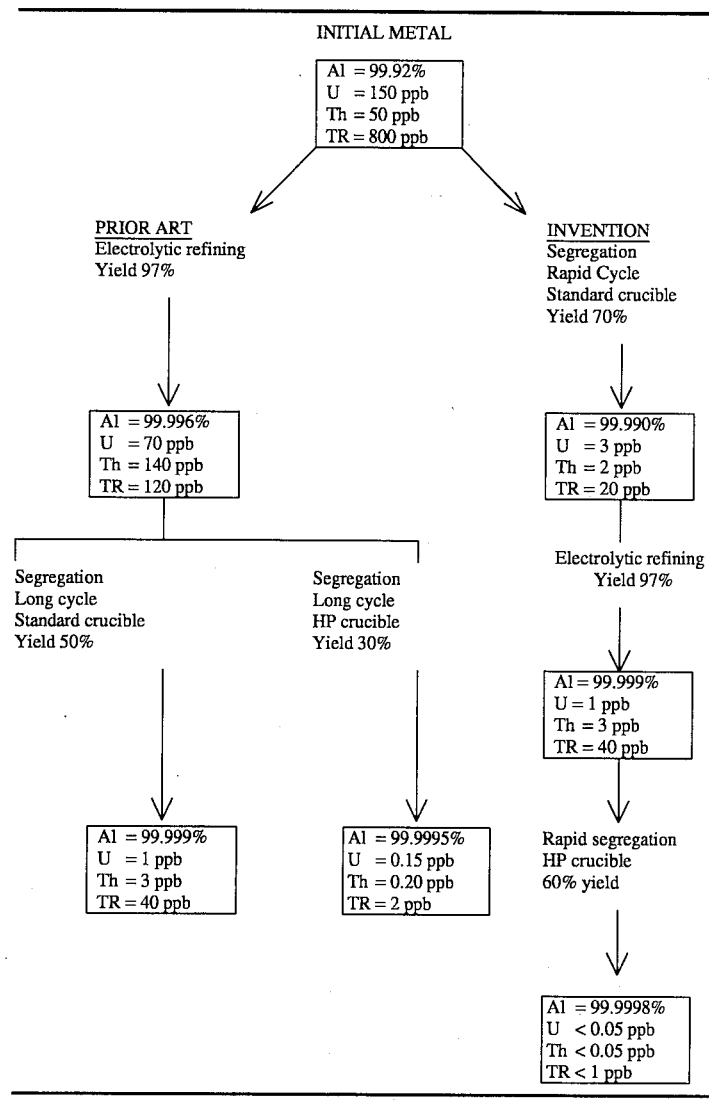
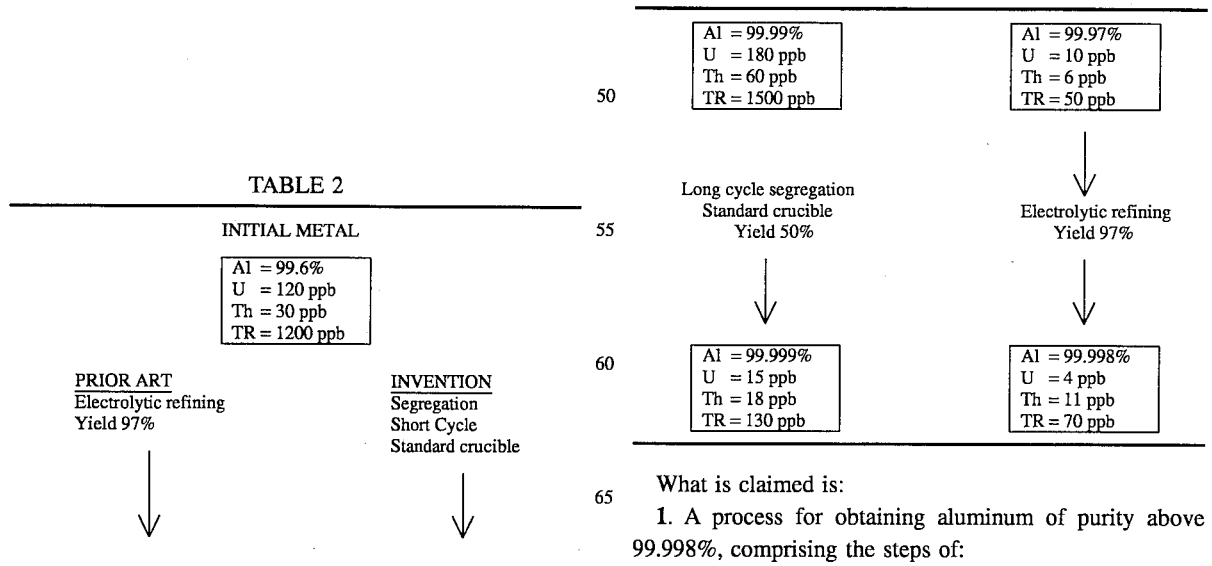
What is claimed is:
1. A process for obtaining aluminum of purity above 99.998%, comprising the steps of:

a) subjecting a liquid aluminum raw material to fractional crystallization to obtain prepurified aluminum crystals in a yield of between 50 and 80% and a liquid aluminum portion of lesser purity;

b) subjecting the prepurified aluminum crystals to a three-layer electrolysis in which a lowermost layer comprises an anodic aluminum-copper alloy layer, an uppermost layer comprises a cathodic purified aluminum layer and a layer therebetween comprises molten salts; and c) removing from said uppermost layer said aluminum of purity above 99.998% in a yield of above 90%, having a total rare earth content of less than 100 ppb, and a total content of U+Th of less than 20 ppb.

2. A process according to claim 1, additionally comprising prepurifying the salts of the electrolytic bath.

3. A process according to claim 2, wherein the salts are prepurified by contacting with liquid aluminum.

4. A process according to claim 1, additionally comprising physically purifying said removed uppermost layer in a high purity crucible with a total U+Th content of <1 ppb with a yield of between 30 and 80%.

5. A process according to claim 4, wherein said physically purifying is performed by fractional crystallization, zone fusion or Czochralsky crystal separation.

6. A process according to claim 1, wherein said fractional crystallization has a yield of 70 to 80%.

* * * * *